(12) United States Patent
Anzai et al.

(10) Patent No.: US 10,397,212 B2
(45) Date of Patent: Aug. 27, 2019

(54) INFORMATION DEVICE, DATA PROCESSING SYSTEM, DATA PROCESSING METHOD, AND NON-TRANSITORY STORAGE MEDIUM FOR EXECUTING CONTENT UPON AUTHENTICATION

(71) Applicant: PANASONIC INTELLECTUAL PROPERTY MANAGEMENT CO., LTD., Osaka (JP)

(72) Inventors: Jun Anzai, Kanagawa (JP); Yoshihiko Kitamura, Tokyo (JP); Mami Kuramitsu, Hiroshima (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 249 days.

(21) Appl. No.: 15/607,978

(22) Filed: May 30, 2017

(65) Prior Publication Data

US 2017/0346808 A1    Nov. 30, 2017

(30) Foreign Application Priority Data

May 31, 2016    (JP) ................. 2016-109386

(51) Int. Cl.
*H04L 29/06*    (2006.01)
*G06F 21/33*    (2013.01)
*G06F 21/31*    (2013.01)

(52) U.S. Cl.
CPC .......... *H04L 63/0807* (2013.01); *G06F 21/31* (2013.01); *G06F 21/335* (2013.01); *H04L 63/10* (2013.01)

(58) Field of Classification Search
None
See application file for complete search history.

(56) References Cited

U.S. PATENT DOCUMENTS

| | | | |
|---|---|---|---|
| 2003/0188117 A1 | 10/2003 | Yoshino et al. | |
| 2014/0068713 A1* | 3/2014 | Nicholson | H04W 12/06 726/3 |
| 2014/0245278 A1* | 8/2014 | Zellen | G06F 8/65 717/170 |
| 2017/0039351 A1* | 2/2017 | Bangole | H04W 12/04 |
| 2017/0346808 A1* | 11/2017 | Anzai | H04L 63/0807 |
| 2018/0173856 A1* | 6/2018 | Ahmed | G06F 21/10 |

FOREIGN PATENT DOCUMENTS

JP    2002-278839    9/2002

* cited by examiner

*Primary Examiner* — Jeffery L Williams
(74) *Attorney, Agent, or Firm* — Greenblum & Bernstein, P.L.C.

(57) ABSTRACT

An information device includes a reader, and a data processor. The reader reads, from a removable medium, ticket data that is provided from a server upon successful authentication, and that includes information representing a content of data processing to be executable upon the successful authentication. The data processor executes the data processing represented in the ticket data.

8 Claims, 11 Drawing Sheets

*FIG. 3*

| TAG | | | ATTRIBUTE | DESCRIPTION |
|---|---|---|---|---|
| Ticket | | | | ELEMENT REPRESENTING "AUTHENTICATION TICKET"<br>PERMIT OMISSION OF START TAG AND END TAG |
| | ID | | | ATTRIBUTE REPRESENTING UNIQUE ID OF THIS TICKET<br>DESCRIBE 16 DIGITS IN MAXIMUM IN HEXADECIMAL |
| | Target | | | ELEMENT REPRESENTING AUTHORITY INFORMATION (PURPOSE) OF TICKET<br>ONLY ONE CAN BE SET |
| | | kind | | ATTRIBUTE REPRESENTING AUTHORITY INFORMATION (PURPOSE) OF TICKET<br>VALUES SHOWN BELOW CAN BE SET AS ATTRIBUTE VALUES<br>・REPROGRAMMING<br>　- SECURITY MODULE AREA: 0 x 08<br>　- BOOT-LOADER AREA: 0 x 1A<br>　- OTHER AREAS (E.G., U-BOOT): 0 x 1F<br>　- WHOLE AREA: 0 x FF<br>・LOG OUTPUT<br>　- WITH OUTPUT OF IMPORTANT LOG: 0 x C1<br>　- WITHOUT OUTPUT OF IMPORTANT LOG: 0 x C2 |
| | USB | | | ELEMENT REPRESENTING UNIQUE ID OF USB<br>ONLY ONE CAN BE SET |
| | | VendorID | | ATTRIBUTE REPRESENTING VENDOR ID OF USB MEMORY<br>VENDOR ID IS DESCRIBED IN TWO DIGITS IN HEXADECIMAL |
| | | ProductID | | ATTRIBUTE REPRESENTING PRODUCT ID OF USB MEMORY<br>PRODUCT ID IS DESCRIBED IN THREE DIGITS IN HEXADECIMAL |
| | | SerialID | | ATTRIBUTE REPRESENTING SERIAL ID OF USB MEMORY<br>SERIAL ID IS DESCRIBED IN 12 DIGITS IN MAXIMUM IN HEXADECIMAL |
| | HU | | | ELEMENT REPRESENTING DATA OF HU-ID<br>ONE OR MORE (AT LEAST ONE) CAN BE SET |
| | | ID | | ATTRIBUTE REPRESENTING HU-ID (HASH VALUE)<br>FOR HU-ID, 32-BYTE DATA IS DESCRIBED IN HEXADECIMAL |
| | Availability | | | ELEMENT REPRESENTING LIMIT OF USE OF TICKET |
| | | times | | ATTRIBUTE REPRESENTING MAXIMUM NUMBER OF TIMES OF USE OF TICKET<br>DESCRIBED IN DECIMAL |

FIG. 4

```
<? xml version="1.0" encoding="UTF-8" ?>
<Ticket ID="9876543210ABCDEF">
  <Target kind="0x08" />
  <USB VendorID="12" ProductID="ABC" SerialID="1234567890AB" />
  <HU ID="11121314151617181920212223242526272829303132333435363738394041 42" />
  <HU ID="21222324252627282930313233343536373839404142434445464748495051 52" />
  <Availability times="3" />
</Ticket>
```

28

INFORMATION DEVICE, DATA PROCESSING SYSTEM, DATA PROCESSING METHOD, AND NON-TRANSITORY STORAGE MEDIUM FOR EXECUTING CONTENT UPON AUTHENTICATION

BACKGROUND

1. Technical Field

The present disclosure relates to data processing techniques, and in particular, relates to an information device, a data processing system, a data processing method, and a non-transitory storage medium.

2. Description of the Related Art

A data access management system for managing accessing from an access device to a data file stored in a memory of a memory-mounted device has been proposed (e.g., see Unexamined Japanese Patent Publication No. 2002-278839). In this data access management system, the access device receives, from a ticket issuing unit, a service permission ticket set with an access mode for permitting the device itself, and outputs the service permission ticket to the memory-mounted device. The memory-mounted device receives the service permission ticket from the access device to execute processing in accordance with the access mode described in the service permission ticket.

SUMMARY

The present disclosure reduces a risk to be caused when a ticket used to control data processing executed by an information device is leaked.

An aspect of the present disclosure is an information device. The information device includes a reader, and a data processor. The reader reads, from a removable medium, ticket data that is provided from a server upon successful authentication, and that includes information representing a content of data processing to be executable upon the successful authentication. The data processor executes the data processing represented in the ticket data.

Another aspect of the present disclosure is a data processing system. The data processing system includes an information device capable of reading data from a removable medium, and a server. The server includes an authentication unit, and an output unit. The authentication unit authenticates a user. When the authentication unit has authenticated the user successfully, the output unit stores ticket data including information representing a content of data processing specified by the user, into the removable medium. The information device includes a reader, and a data processor. The reader reads ticket data from the removable medium. The data processor executes the data processing represented in the ticket data.

Still another aspect of the present disclosure is a data processing method. The data processing method is executed by an information device. The data processing method includes reading ticket data, and executing data processing. In the reading of the ticket data, ticket data that is provided from a server upon successful authentication, and that includes information representing a content of data processing to be executable upon the successful authentication is read from the removable medium. In the executing of the data processing, the data processing represented in the read ticket data is executed.

Still another aspect of the present disclosure is a non-transitory storage medium. The non-transitory storage medium contains a program for causing an information device that is a computer to execute a data processing method. The data processing method includes reading ticket data, and executing data processing. In the reading of the ticket data, ticket data that is provided from a server upon successful authentication, and that includes information representing a content of data processing to be executable upon the successful authentication is read from the removable medium. In the executing of the data processing, the data processing represented in the read ticket data is executed.

Any desired combinations of the above described components and modifications of the aspects of the present disclosure in devices, methods, computer programs, recording media containing the computer programs (including computer-readable non-transitory recording media), vehicles mounted with this device, and other entities are still effective as other aspects of the present disclosure.

According to the present disclosure, it is possible to reduce a risk to be caused when a ticket used to control data processing executed by an information device is leaked.

BRIEF DESCRIPTION OF DRAWINGS

FIG. 3 is a diagram illustrating a configuration of ticket data illustrated in FIG. 2;

FIG. 4 is a diagram illustrating an example of a document of the ticket data illustrated in FIG. 2;

DETAILED DESCRIPTION

Figure 1:
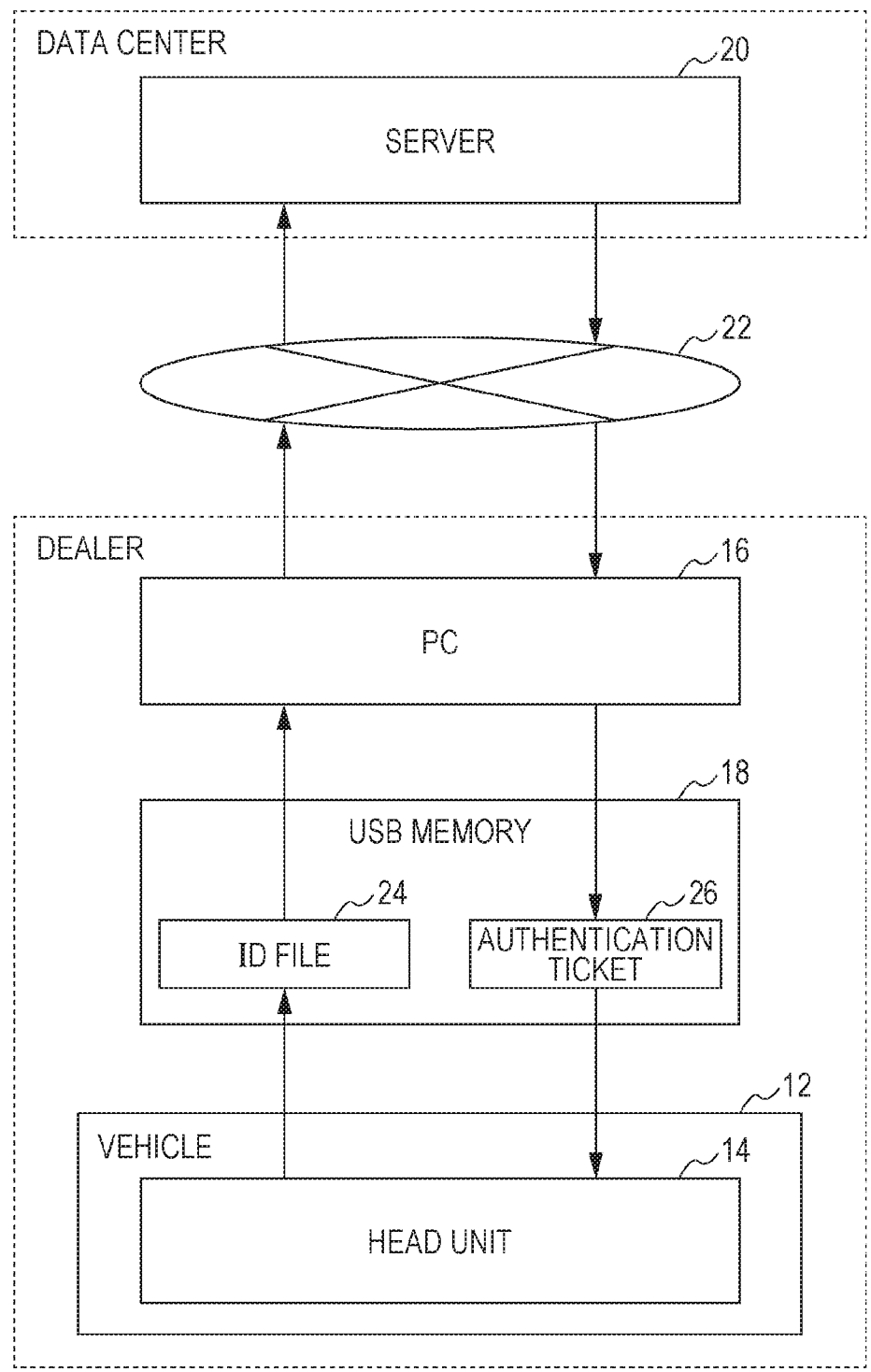
FIG. 1 is a diagram illustrating a configuration of an information processing system according to a first exemplary embodiment.

Prior to describing exemplary embodiments of the present disclosure, problems found in a conventional technique will be now briefly described herein. An effective way to achieve higher security in an information device such as a head unit mounted into a vehicle is to use a ticket representing an authority over data processing in the information device. However, a system is needed for decreasing the risk when the ticket is leaked. A possible way to reduce the risk when a ticket is leaked is to store information regarding a user of the ticket as disclosed in Unexamined Japanese Patent Publication No. 2002-278839 described above. However, limiting a user of a ticket might lead to inconvenience in operations such as a maintenance operation of an information device.

Prior to specifically describing the exemplary embodiments, an outline of the exemplary embodiments will be described herein.

In the exemplary embodiments, an information device for which security in data processing is improved is a head unit mounted into a vehicle. A head unit may be, for example, a car navigation device, an audio and video player, a television receiver, or a radio receiver, or may be an information processing device having a plurality of functions of these devices.

The head unit according to one of the exemplary embodiments executes data processing based on an authentication ticket under a condition of successful authentication from a server. This authentication ticket is provided from the server, and is stored in a removable medium, and the head unit reads the authentication ticket from the removable medium. Therefore, even for a head unit that sometimes cannot be connected to a server in a wired or wireless manner—even for a head unit that sometimes cannot be authenticated by the server, so to speak, since data processing is executed only under a condition of successful authentication from the server, higher security for the head unit can be achieved.

An authentication ticket according to one of the exemplary embodiments is data that represents predetermined authentication from a server has succeeded, and is data that provides the head unit with an authority over data processing. Specifically, the authentication ticket includes data specifying a content (e.g., a type and a parameter value) of data processing permitted for the head unit. The head unit executes data processing specified in the authentication ticket, and suppresses execution of data processing that is not specified in the authentication ticket. A negative effect when the authentication ticket is leaked can be therefore reduced. Each of the authentication tickets according to the exemplary embodiments does not include limitation on a ticket user. Therefore, even in operations such as a maintenance operation of a head unit, in which identifying a ticket user is difficult, it can prevent deterioration of operability of the head unit and can prevent deterioration of work efficiency on the head unit.

For a head unit, data processing of a type set beforehand, such as reprogramming (updating of an existing program), updating of vehicular parameters, and acquiring logs may be executed under a condition that permission is acquired through an authentication ticket. For example, processes that should obviously be executed in a head unit, such as audio and video processing, may be executed regardless of whether an authentication ticket is present. On the other hand, predetermined data processing classified into a maintenance purpose such as addition, change, and deletion of a system program in the head unit may be executed under a condition that permission is acquired through an authentication ticket.

First Exemplary Embodiment

FIG. 1 illustrates a configuration of information processing system 10 according to a first exemplary embodiment. Information processing system 10 includes head unit 14, personal computer (PC) 16, and server 20. In the first exemplary embodiment, an authentication ticket causes head unit 14 to execute data processing for a maintenance purpose (hereinafter referred to as a "maintenance process"). A technology described in the first exemplary embodiment is useful not only for the maintenance process, but also for causing head unit 14 to execute a variety of data processing.

Server 20 is an information processing device installed in a data center of a manufacturer of head unit 14. PC 16 is an information terminal operated by a person in charge (e.g., an engineer, hereinafter referred to as a "user") of the manufacturer of head unit 14. Server 20 may be installed in a data center of a manufacturer of vehicle 12, and a user may be a person in charge (e.g., an engineer) of a car dealer. PC 16 and server 20 are connected via intranet 22. PC 16 and server 20 may be connected via a communication network of another type, such as a local area network (LAN), a wide area network (WAN), an extranet, and the internet. PC 16 can be replaced with a smart phone or a tablet terminal.

Head unit 14 is mounted into vehicle 12, and, in the first exemplary embodiment, a user performs a maintenance operation. Head unit 14 does not include an interface capable of directly communicating with server 20, but exchanges data with PC 16 via universal serial bus (USB) memory 18.

USB memory 18 is an auxiliary storage device (a mass storage device) equipped with a semiconductor memory from and onto which data can be read and written, and is a removable medium connected to head unit 14 and PC 16 via a USB. This removable medium should have at least a storage function, and may not necessarily have an information processing function such as an arithmetic operation. The removable medium is not limited to USB memory 18, but may be a desired mass storage device, such as a secure digital (SD) memory card, or a dongle.

In USB memory 18, identification (ID) file 24 and authentication ticket 26 are stored. ID file 24 contains identification information unique to head unit 14, and is an electronic file storing identification information (hereinafter also referred to as a "head unit-identification (HU-ID)") with which certain head unit 14 can be distinguished from other devices, and uniquely identified.

Figure 2:
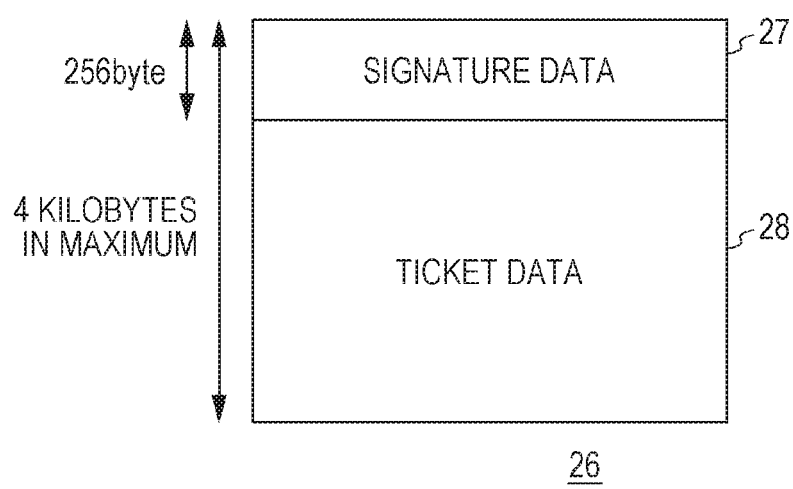
FIG. 2 is a diagram illustrating a configuration of an authentication ticket illustrated in FIG. 1.

FIG. 2 illustrates a configuration of authentication ticket 26 illustrated in FIG. 1. Authentication ticket 26 includes signature data 27 and ticket data 28, and is data having a maximum capacity of four kilo bytes. Ticket data 28 is main data of authentication ticket 26, and is, as described later, a document written in an extensible markup language (XML). Signature data 27 is electronic signature data added by server 20 so that whether ticket data 28 is falsified can be detected. For example, signature data 27 may be data obtained by coding a Hash value of ticket data 28, which is generated by a predetermined Hash function (e.g., secure Hash algorithm 256-bit (SHA-256)), through a public key coding method such as RSA (RSA represents initials of family names of the three inventors: Ron Rivest, Adi Shamir, and Leonard Adleman). For example, signature data 27 may be data coded by a private key for server 20, and, as described later, may be decoded by a public key for server 20, and then verified by head unit 14.

FIG. 3 illustrates a configuration of ticket data 28 illustrated in FIG. 2. An ID attribute value of a Ticket tag is hereinafter also referred to as a "ticket ID." FIG. 3 exemplifies, as authority information (purpose) of a ticket, reprogramming and log output. Actually, as authority information (purpose) of a ticket, a variety of data processing not illustrated can be set. For example, head unit 14 may be caused to store beforehand a correspondence relationship between authority information (a kind attribute value of a target tag) that can be specified in ticket data 28 and a content of data processing. Authority information (i.e., a type of data processing) that can be specified in ticket data 28 may include switching to an analysis mode or a test mode, or may include activation of a debugging function or a test port.

Reprogramming includes rewriting of an existing program and an existing parameter in head unit 14. An update program and an update parameter for rewriting an existing program and an existing parameter may be stored in USB memory 18. Targets of reprogramming may include a program including security information (or a storage area for the program), a part of an operating system (OS) used before start up and a part of the OS used after start up, a NOR memory or a NAND memory, and their combinations. An update program and an update parameter may each be added by a signature that differs from a signature of signature data 27. Before rewriting an existing program and an existing parameter, head unit 14 (maintenance processor 58, described later) may verify the signature added to each of the update program and the update parameter, and may execute rewriting only when the signature is verified successfully.

Through log output, outputting at least a part of logs accumulated in head unit 14 to USB memory 18 is instructed. In the first exemplary embodiment, a type of a log to be output can be specified. In ticket data 28, coding of a log to be output to USB memory 18 (e.g., coding using a public key for PC 16, or coding using a predetermined common key) may further can be specified.

FIG. 4 illustrates an example of a document of ticket data 28 illustrated in FIG. 2. In ticket data 28 illustrated in FIG. 4, as authority information of an authentication ticket, reprogramming of a security module area in a storage area of head unit 14 is specified. In ticket data 28 illustrated in FIG. 4, a maximum number of times a ticket is used is set to three.

Although not illustrated in FIGS. 3, 4, ticket data 28 may include identification information of illicit ticket data, in other words, information representing a ticket ID of illicit ticket data (hereinafter also referred to as "illicit ticket information"). Illicit ticket data includes a ticket leaked externally (e.g., a third party who is not a valid user of the ticket), or a ticket that is turned out to be used in an illicit manner. As a setting example of illicit ticket information, ticket data 28 may include one or more of "unauthorized_ticket" tags each corresponding to one or more of pieces of illicit ticket data. As an "ID" attribute value of each of the "unauthorized_ticket" tags, a ticket ID of each of the pieces of illicit ticket data may be set.

Figure 5:
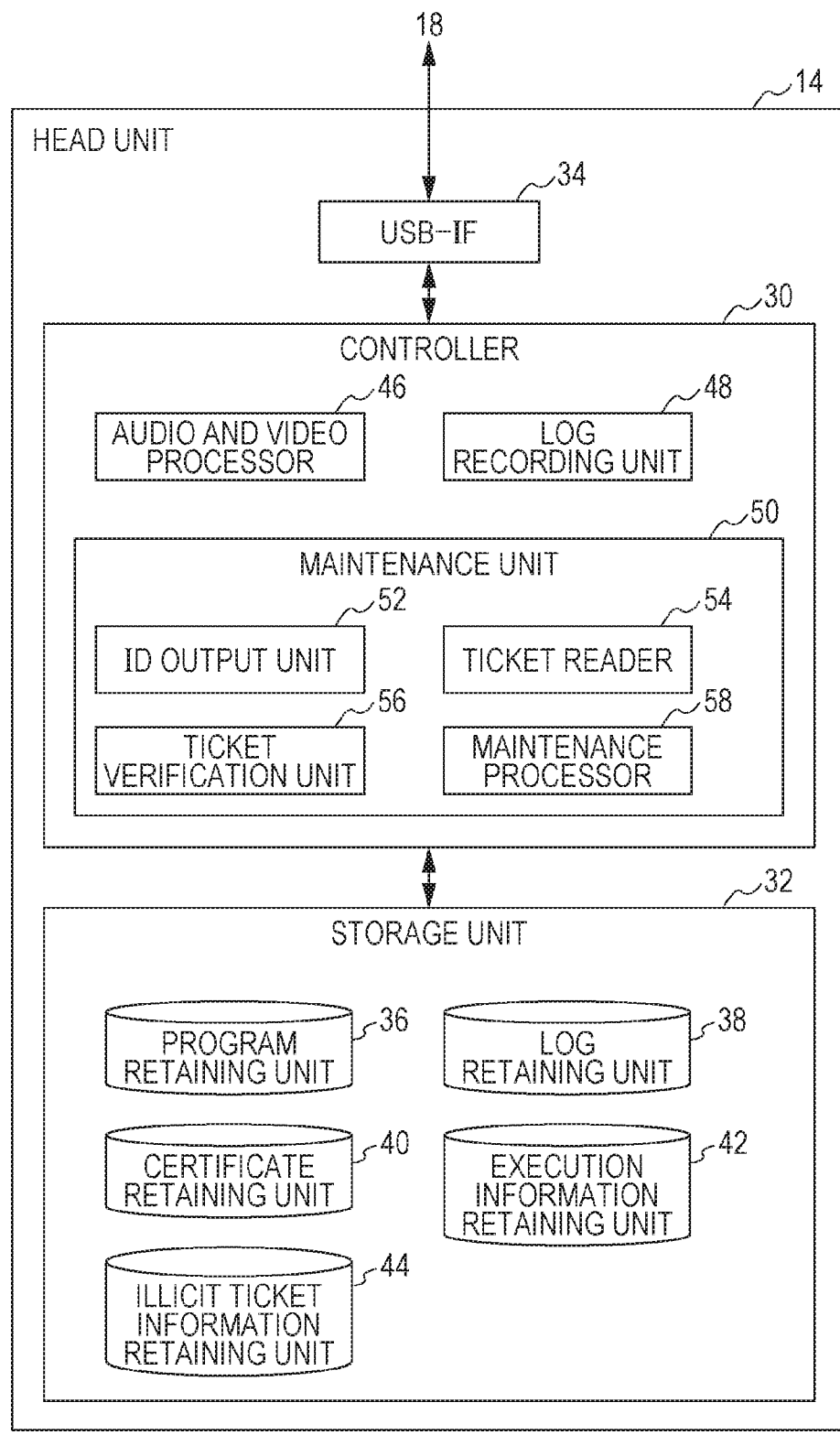
FIG. 5 is a block diagram illustrating a functional configuration of a head unit illustrated in FIG. 1.

FIG. 5 is a block diagram illustrating a functional configuration of head unit 14 illustrated in FIG. 1. Blocks illustrated in the block diagrams of this specification can be achieved by, in terms of hardware, a central processing unit (CPU) of a computer, elements including a memory, and machine devices, and can be achieved by, in terms of software, computer programs and other programs. Here describe functional blocks achieved through cooperation of the above described components. It will be understood by those skilled in the art that these functional blocks can be achieved in various forms through combinations of hardware and software.

Head unit 14 includes controller 30, storage unit 32, and universal serial bus-interface (USB-IF) 34. Controller 30 executes a variety of data processing in head unit 14. Storage unit 32 stores a variety of data that will be referred to or updated by controller 30. USB-IF 34 provides an interface function through a USB. Controller 30 reads data stored in USB memory 18, or stores data in USB memory 18, via USB-IF 34.

Storage unit 32 may be achieved by a non-volatile recording medium such as a hard disk or a flash memory. Storage unit 32 includes program retaining unit 36, log retaining unit 38, certificate retaining unit 40, execution information retaining unit 42, and illicit ticket information retaining unit 44.

Program retaining unit 36 retains various programs to be executed by controller 30. Programs retained in program retaining unit 36 include system software (e.g., OS software), application software (e.g., navigation software), and maintenance software. Maintenance software is a group of programs having functions of maintenance unit 50 described later.

Log retaining unit 38 retains a log representing a state of head unit 14. Recorded in a log includes, for example, information representing how the system software, the application software, and the maintenance software are executed (information representing normal shut-down or abnormal shut-down). Certificate retaining unit 40 retains certificate data for server 20 including a public key for server 20.

Execution information retaining unit 42 retains information representing a state of use of an authentication ticket to date (use state). Specifically, execution information retaining unit 42 retains a number of times of execution of data processing to date based on an authentication ticket. Illicit ticket information retaining unit 44 retains one or more of ticket IDs of authentication tickets regarded as illicit, so to speak, retains a black list representing illicit authentication tickets.

Controller 30 can be achieved by a hardware resource and a software resource cooperating each other, or by a hardware resource only. Available hardware resources include a processor, a read only memory (a ROM), a random access memory (a RAM), and other large-scale integration (an LSI), and available software resources include an operating system, an application, and a program such as firmware. Controller 30 includes audio and video processor 46, log recording unit 48, and maintenance unit 50.

Audio and video processor 46 executes, as a user function in head unit 14, a process regarding an output of audio or video. For example, based on the navigation software retained in program retaining unit 36, audio and video processor 46 may play navigation audio, may cause a speaker (not illustrated) to output the audio, or may play navigation video, and may cause a display (not illustrated) to show the video.

Maintenance unit 50 achieves a maintenance function in head unit 14. Maintenance unit 50 may be achieved by allowing a CPU to execute the maintenance software stored in program retaining unit 36. Maintenance unit 50 includes ID output unit 52, ticket reader 54, ticket verification unit 56, and maintenance processor 58.

When a predetermined condition is satisfied, ID output unit 52 generates ID file 24 in USB memory 18, and stores in generated ID file 24 an HU-ID set beforehand to head unit 14. The above described predetermined condition may be satisfied when a predetermined operation entered into head unit 14 is detected. The above described predetermined condition may also be satisfied when USB memory 18 is connected, and a predetermined file that is set beforehand as a trigger for outputting an HU-ID and that is stored in USB memory 18 is detected. The above described predetermined file may be a file having a certain name set beforehand, or a file including certain data set beforehand (e.g., a command).

When USB memory 18 is connected, and authentication ticket 26 contained in USB memory 18 is detected, ticket reader 54 reads data of authentication ticket 26 from USB memory 18. Ticket reader 54 may detect whether authentication ticket 26 is present based on a file name, or may detect whether authentication ticket 26 is present based on a content of a file (whether an XML document conforming to a format of an authentication ticket is present). As illustrated in FIG. 2, authentication ticket 26 includes signature data 27 and ticket data 28. Ticket data 28 includes data representing a content of data processing that is to be executable by head unit 14 upon successful authentication in server 20.

Ticket reader 54 reads, from USB memory 18, separately from authentication ticket 26, identification information that is unique to USB memory 18 and that allows discrimination and identification in a unique manner of USB memory 18 from other devices (hereinafter also referred to as an "USB-ID"). As illustrated in FIG. 3, a USB-ID includes a vendor ID, a product ID, and a serial ID.

Ticket verification unit 56 executes a verification process for confirming whether authentication ticket 26 read by ticket reader 54 is an authorized one. In other words, ticket verification unit 56 executes a verification process for confirming whether data processing specified in authentication ticket 26 should be executed.

Specifically, ticket verification unit 56 uses a public key (a server certificate) for server 20, which is stored in certificate retaining unit 40 to decode a Hash value of ticket data 28 from signature data 27. Ticket verification unit 56 also uses a predetermined Hash function (e.g., SHA-256) to generate a Hash value of ticket data 28. When both the Hash values match with each other, ticket verification unit 56 determines that authentication ticket 26 is an authorized one, and that the data processing specified in authentication ticket 26 should be executed.

Ticket verification unit 56 further determines whether an HU-ID (an ID attribute value of a head unit (HU) tag) set in ticket data 28 matches with the HU-ID set beforehand in head unit 14. When both the HU-IDs match, ticket verification unit 56 determines that authentication ticket 26 is an authorized one issued to the head unit itself, and that the data processing specified in authentication ticket 26 should be executed.

Ticket verification unit 56 further determines whether a USB-ID (a vendor ID attribute value, a product ID attribute value, and a serial ID attribute value of a USB tag) set in ticket data 28 matches with a USB-ID that ticket reader 54 has acquired from USB memory 18. When both the USB-IDs match, ticket verification unit 56 determines that authentication ticket 26 is an authorized one issued to USB memory 18 connected to the head unit itself, and that the data processing specified in authentication ticket 26 should be executed.

When ticket verification unit 56 has verified authentication ticket 26 successfully, in other words, when authentication ticket 26 has been determined as an authorized one, maintenance processor 58 executes the data processing represented in authentication ticket 26 (in the first exemplary embodiment, a maintenance process). Specifically, maintenance processor 58 executes a maintenance process represented by a kind attribute value of a target tag in ticket data 28 read by ticket reader 54. Maintenance processor 58 executes data processing specified in ticket data 28 proactively, in other words, autonomously without relying on a control of an external device, in other words, without being triggered by the control of the external device. When ticket verification unit 56 has verified authentication ticket 26 successfully, maintenance processor 58 may determine that authentication through server 20 has been successful, and may make data processing represented in authentication ticket 26 executable. On the other hand, when ticket verification unit 56 has failed to verify authentication ticket 26, maintenance processor 58 may determine that authentication through server 20 has been failed, and may prohibit (suppress) execution of data processing represented in authentication ticket 26.

Maintenance processor 58 may retain a correspondence relationship between a plurality of attribute values of types that can be set in a kind attribute of a Target tag in ticket data 28 and contents of data processing specified by the attribute values. For example, a table defining combinations of attribute values and contents of data processing may be retained. Maintenance processor 58 may identify data processing corresponding to a kind attribute value of a target tag in ticket data 28 read in accordance with a correspondence relationship set beforehand to execute the identified data processing.

As an example, a kind attribute value of a target tag in ticket data 28 is set to "0x08" (reprogramming in the security module area). In this case, maintenance processor 58 may read, from USB memory 18, a file having a name set beforehand as an update program for the security module area to update an existing program stored in the security module area in program retaining unit 36 using the read update program. In other words, the existing program in the security module area may be replaced with a new program read from USB memory 18. As ticket data 28, data specifying a program file for reprogramming (e.g., names of or path names of an existing program and an update program) may be further specified.

As another example, a kind attribute value of a target tag in ticket data 28 is set to "0xC2" (without outputting important log in log output). In this case, maintenance processor 58 stores, in USB memory 18, data of logs acquired by excluding logs with higher priority (e.g., logs to which an importance flag is set, or logs having a score of priority equal to or greater than a predetermined value) from data of logs stored in log retaining unit 38. As ticket data 28, information specifying a location to which a log will be output (e.g., a path name in USB memory 18) may be further specified. When a log includes a date and a time of output or a date and a time of when an event has occurred, a limit to dates and times of target logs to be output may be further specified as ticket data 28. Among logs stored in log retaining unit 38, certain logs, such as logs having a predetermined title, logs representing a predetermined content, or logs to be output to a predetermined area, may be set beforehand as logs with higher priority. When output of important logs is specified, maintenance processor 58 may extract certain logs specified beforehand as important logs.

When authentication ticket 26 verified successfully by ticket verification unit 56 specifies a maximum number of times of maintenance processes, maintenance processor 58 executes a maintenance process represented in authentication ticket 26 within the maximum number of times.

Specifically, when ticket data 28 specifies a maximum number of times a ticket is used (a times attribute of an availability tag), maintenance processor 58 stores information representing a number of times the maintenance process is executed in execution information retaining unit 42, and, each time the maintenance process is executed, increments the number of times of execution. When ticket verification unit 56 has verified authentication ticket 26 successfully, and a number of times of execution stored in execution information retaining unit 42 is below a maximum number of times specified in ticket data 28, maintenance processor 58 executes a maintenance process specified in ticket data 28. On the other hand, when a number of times of execution stored in execution information retaining unit 42 has reached the maximum number of times specified in ticket data 28, execution of the maintenance process specified in ticket data 28 is suppressed.

An exemplary modification may be configured not to include a ticket ID as an element of the XML in ticket data 28. In this case, head unit 14 (ID output unit 52) may issue (record in USB memory 18) an HU-ID as not a fixed value but a random value, in other words, data having a value that differs depending on a timing, at each time of outputting to USB memory 18. Simultaneously, head unit 14 (ID output unit 52) may store the issued HU-ID (random value) in storage unit 32 of head unit 14. Ticket verification unit 56 or maintenance processor 58 of head unit 14 can compare the HU-ID (the random value) represented in ticket data 28 with the HU-ID (the random value) stored beforehand in storage unit 32 to determine whether ticket data 28 has been issued to the head unit itself.

When a maximum number of times of data processing is specified in ticket data 28, maintenance processor 58 may link an HU-ID (a random value) to a number of times a maintenance process is executed, and store the HU-ID in execution information retaining unit 42. For example, when data processing based on first ticket data 28 is executed, maintenance processor 58 may link information representing a number of times of the data processing (a number of times of actual execution A) to an HU-ID represented in first ticket data 28, and record the information. On the other hand, when data processing based on second ticket data 28 that differs from first ticket data 28 is executed, maintenance processor 58 may link information representing a number of times of the data processing (a number of times of actual execution B) to an HU-ID represented in second ticket data 28, which differs from the HU-ID represented in first ticket data 28, and record the information. In this aspect, since single head unit 14 issues a plurality of different types of HU-IDs, a number of times of execution per HU-ID (i.e., per ticket) can be managed. For example, a number of times of data processing based on first ticket data 28 can be managed as a number of times of actual execution A, while a number of times of data processing based on second ticket data 28 can be managed as a number of times of actual execution B. In addition, limits in numbers of times a plurality of pieces of ticket data 28 is used can each be achieved only by an HU-ID.

When, after an HU-ID is issued at a certain timing, another new HU-ID is issued at another timing, even if a number of times of execution linked to the HU-ID issued at the older timing is below a maximum number of times for ticket data 28 data processing is permitted at least once), the number of times of execution linked to the older HU-ID may be deactivated. The new HU-ID is then used to switch management of a number of times of execution for ticket data 28. Older ticket data 28 (authentication ticket 26), which has not yet used to a limit, can therefore be deactivated.

When authentication ticket 26 includes illicit ticket information, maintenance processor 58 stores a ticket ID represented in the illicit ticket information in illicit ticket information retaining unit 44. When a ticket ID represented in ticket data 28 verified successfully by ticket verification unit 56 matches with a ticket ID stored in illicit ticket information retaining unit 44, maintenance processor 58 determines ticket data 28 as being illicit, and suppresses execution of maintenance process represented in ticket data 28.

Log recording unit 48 stores data of a log representing a state of head unit 14 in log retaining unit 38. For example, at each time audio and video processor 46 and maintenance unit 50 execute data processing, log recording unit 48 may store data of a log representing a result of the data processing or whether there is an abnormality, in log retaining unit 38. Log recording unit 48 follows adds data representing priority of the log to each piece of log data in accordance with a standard set beforehand. For example, relatively lower priority may be set for a log showing normality, while relatively higher priority may be set for a log showing abnormality.

Figure 6:
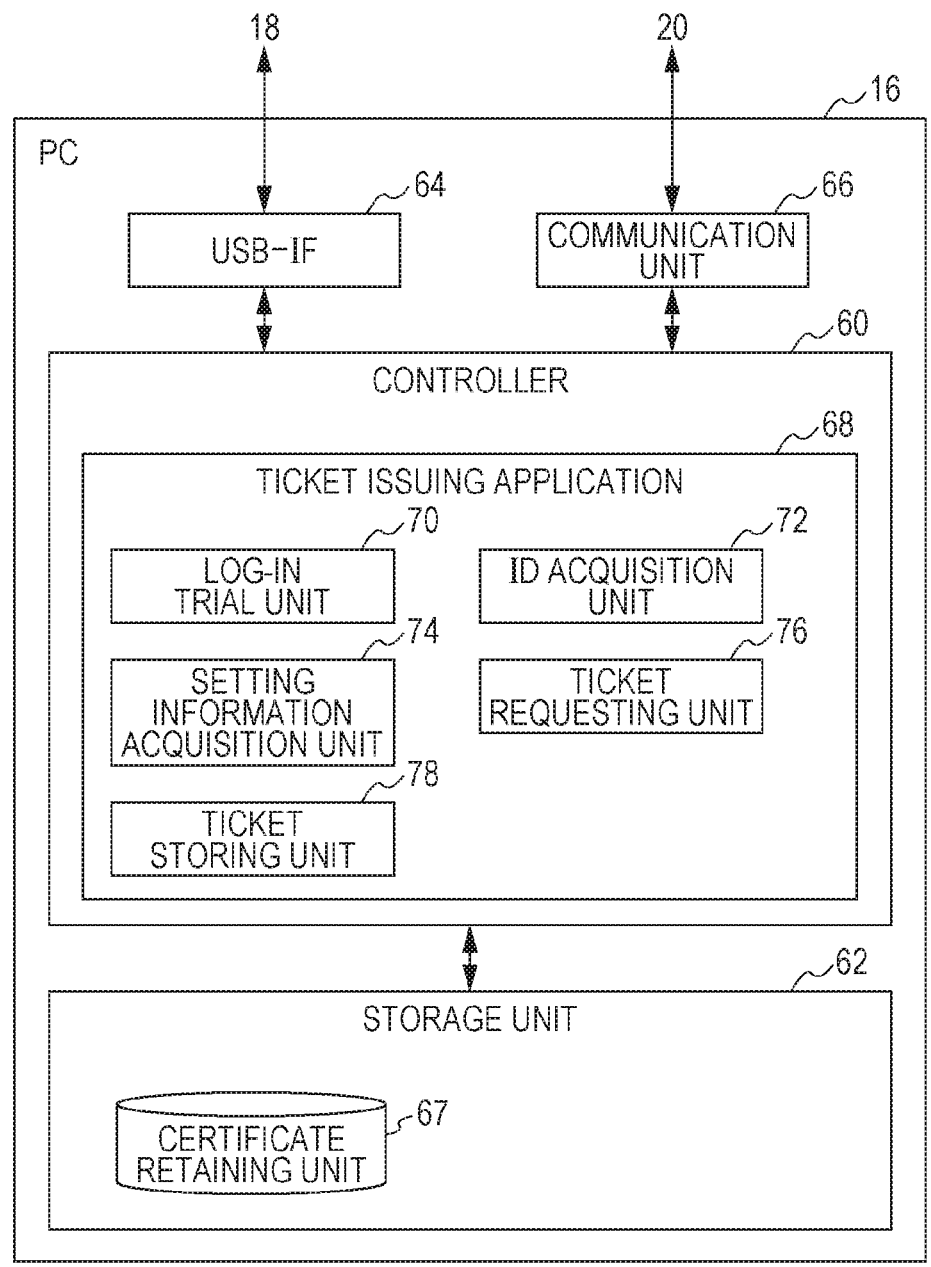
FIG. 6 is a block diagram illustrating a functional configuration of a personal computer (PC) illustrated in FIG. 1.

FIG. 6 is a block diagram illustrating a functional configuration of PC 16 illustrated in FIG. 1. PC 16 includes controller 60, storage unit 62, USB-IF 64, and communication unit 66. Controller 60 executes a variety of data processing in PC 16. Storage unit 62 stores a variety of data that will be referred to or updated by controller 60. USB-IF 64 provides an interface function through a USB. Controller 60 reads data stored in USB memory 18, or stores data in USB memory 18, via USB-IF 64. Communication unit 66 communicates with external devices in accordance with various communication protocols. Controller 60 sends and receives data to and from server 20 via communication unit 66.

Storage unit 62 includes certificate retaining unit 67. Certificate retaining unit 67 retains a client certificate issued beforehand to PC 16 for a purpose of client authentication in server 20.

Controller 60 includes log-in trial unit 70, ID acquisition unit 72, setting information acquisition unit 74, ticket requesting unit 76, and ticket storing unit 78. Functions represented by these blocks may be achieved when a CPU of PC 16 causes ticket issuing application 68, which is installed beforehand in storage unit 62 of PC 16, to run.

Log-in trial unit 70 executes a process for logging in to server 20. Specifically, log-in trial unit 70 sends a connection request telegraphic message to server 20, and cooperates with server 20 to execute a known authentication sequence.

For example, log-in trial unit 70 may send a client certificate stored in certificate retaining unit 67 to server 20 to request server 20 for client authentication. Log-in trial unit 70 may also send, to server 20, an ID and a password of a user entered by the user or stored beforehand in storage unit 62 so as to request server 20 for password authentication. When receiving a challenge (e.g., a random numeric value string) from server 20 during an authentication sequence, log-in trial unit 70 may combine a password of a user and the challenge to generate a response, and may send the generated response to server 20 so as to request server 20 for authentication.

When the process for logging in to server 20 executed by log-in trial unit 70 is successful, in other words, server 20 has successfully authenticated at least either of a user and PC 16, ID acquisition unit 72 reads an HU-ID from ID file 24 stored in USB memory 18. ID acquisition unit 72 further reads a USB-ID from USB memory 18.

Setting information acquisition unit 74 reads ticket setting information representing various parameters that have been entered by a user and that should to be set in authentication ticket 26. Ticket setting information includes data representing a content of data processing that should be executed (that is permitted to be executed) by head unit 14, in other words, data that should be set in a kind attribute of a Target tag in ticket data 28. The ticket setting information also includes data specifying a maximum number of times authentication ticket 26 is used, in other words, data that should be set in a times attribute of an availability tag in ticket data 28. Setting information acquisition unit 74 may cause a display (not illustrated) of PC 16 to show a screen for allowing a user to enter ticket setting information so as to acquire parameter values entered on the screen as ticket setting information.

Ticket requesting unit 76 sends, to server 20, a ticket request telegraphic message, which includes an HU-ID and a USB-ID acquired by ID acquisition unit 72, and ticket setting information acquired by setting information acquisition unit 74. When receiving data (signature data 27 and ticket data 28) of authentication ticket 26 provided from server 20 as a response to the ticket request telegraphic message, ticket storing unit 78 stores the data of authentication ticket 26 in USB memory 18.

Figure 7:
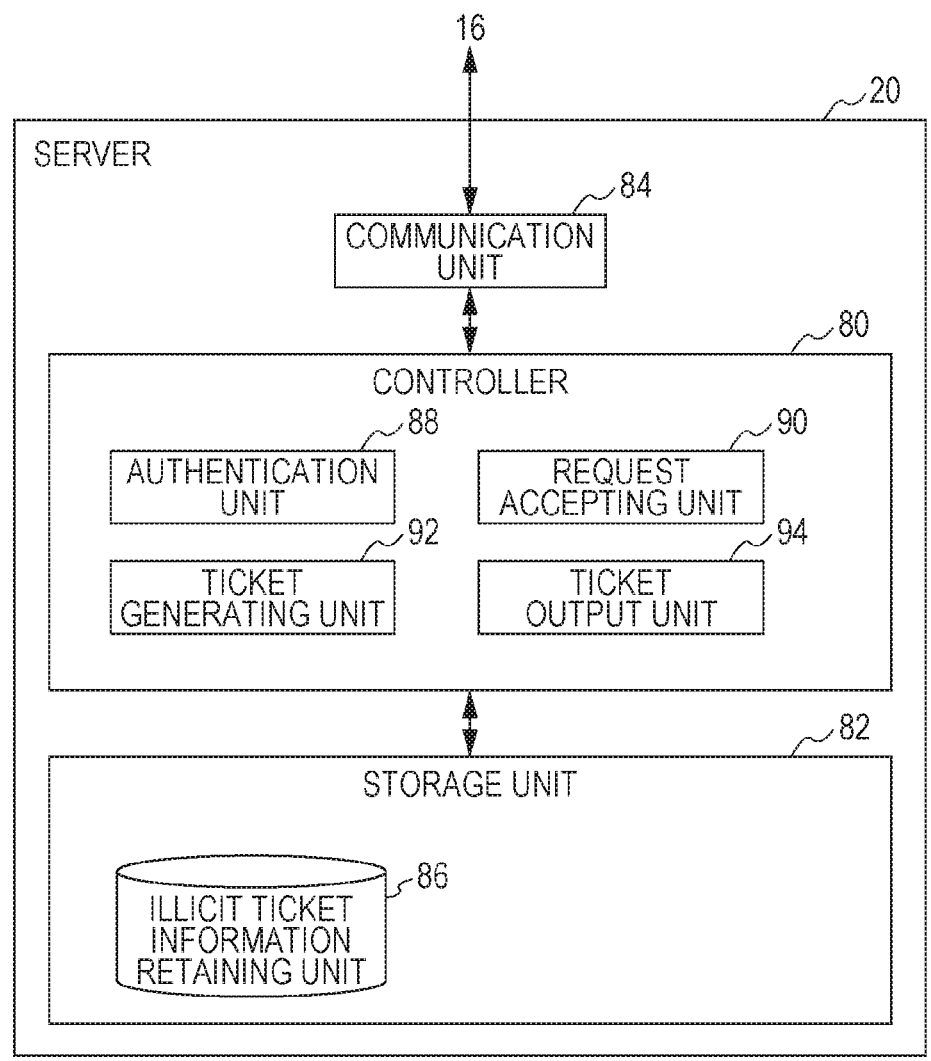
FIG. 7 is a block diagram illustrating a functional configuration of a server illustrated in FIG. 1.

FIG. 7 is a block diagram illustrating a functional configuration of server 20 illustrated in FIG. 1. Server 20 includes controller 80, storage unit 82, and communication unit 84. Controller 80 executes a variety of data processing in server 20. Storage unit 82 stores a variety of data that will be referred to or updated by controller 80. Communication unit 84 communicates with external devices in accordance with various communication protocols. Controller 80 sends and receives data to and from PC 16 via communication unit 84.

Storage unit 82 includes illicit ticket information retaining unit 86. Illicit ticket information retaining unit 86 retains one or more of ticket IDs of authentication tickets recognized as illicit, so to speak, retains a black list representing illicit authentication tickets. Storage unit 82 may further retain information for authenticating a user (e.g., an ID and a password of a user).

Controller 80 includes authentication unit 88, request accepting unit 90, ticket generating unit 92, and ticket output unit 94. When receiving a connection request telegraphic message sent from PC 16, authentication unit 88 cooperates with PC 16, and executes a known authentication sequence set beforehand so as to authenticate at least either of a user and PC 16. In other words, authentication unit 88 confirms validity of at least either of the user and PC 16 (hereinafter simply referred to as "authenticate a user"). When the user has been authenticated successfully, in other words, when validity of the user has been confirmed, authentication unit 88 sends a connection response representing the successful authentication to PC 16.

For example, authentication unit 88 may authenticate a user based on a client certificate sent from PC 16 (client authentication). Authentication unit 88 may also receive an ID and a password of a user from PC 16, and verify the received ID and the received password with an ID and a password retained beforehand in storage unit 82 to authenticate the user (password authentication). Authentication unit 88 may send a challenge to PC 16, and may authenticate a user based on a response sent from PC 16 (challenge and response authentication).

Request accepting unit 90 receives a ticket request telegraphic message sent from PC 16. Ticket generating unit 92 numbers a unique ticket ID. Ticket generating unit 92 generates ticket data 28 that is an XML document setting a unique ticket ID, and an HU-ID, a USB-ID, and ticket setting information included in the ticket request telegraphic message received from request accepting unit 90. Ticket generating unit 92 obtains a Hash value of ticket data 28 based on a predetermined Hash function (e.g., SHA-256), codes the Hash value with a private key for server 20, and generates signature data 27.

Ticket generating unit 92 sets illicit ticket information (a ticket ID of an illicit ticket) retained in illicit ticket information retaining unit 86, in ticket data 28. As described above, "unauthorized_ticket" tags in a quantity corresponding to a quantity of illicit tickets may be set, and a ticket ID may be set as ID attribute values of tags.

Ticket output unit 94 sends to PC 16, as a response to the ticket request telegraphic message, authentication ticket 26 that includes signature data 27 and ticket data 28, and that has been generated by ticket generating unit 92. As described above, authentication ticket 26 is stored in. USB memory 18 via PC 16.

An operation of information processing system 10 configured as described above will now be described herein.

Figure 8:
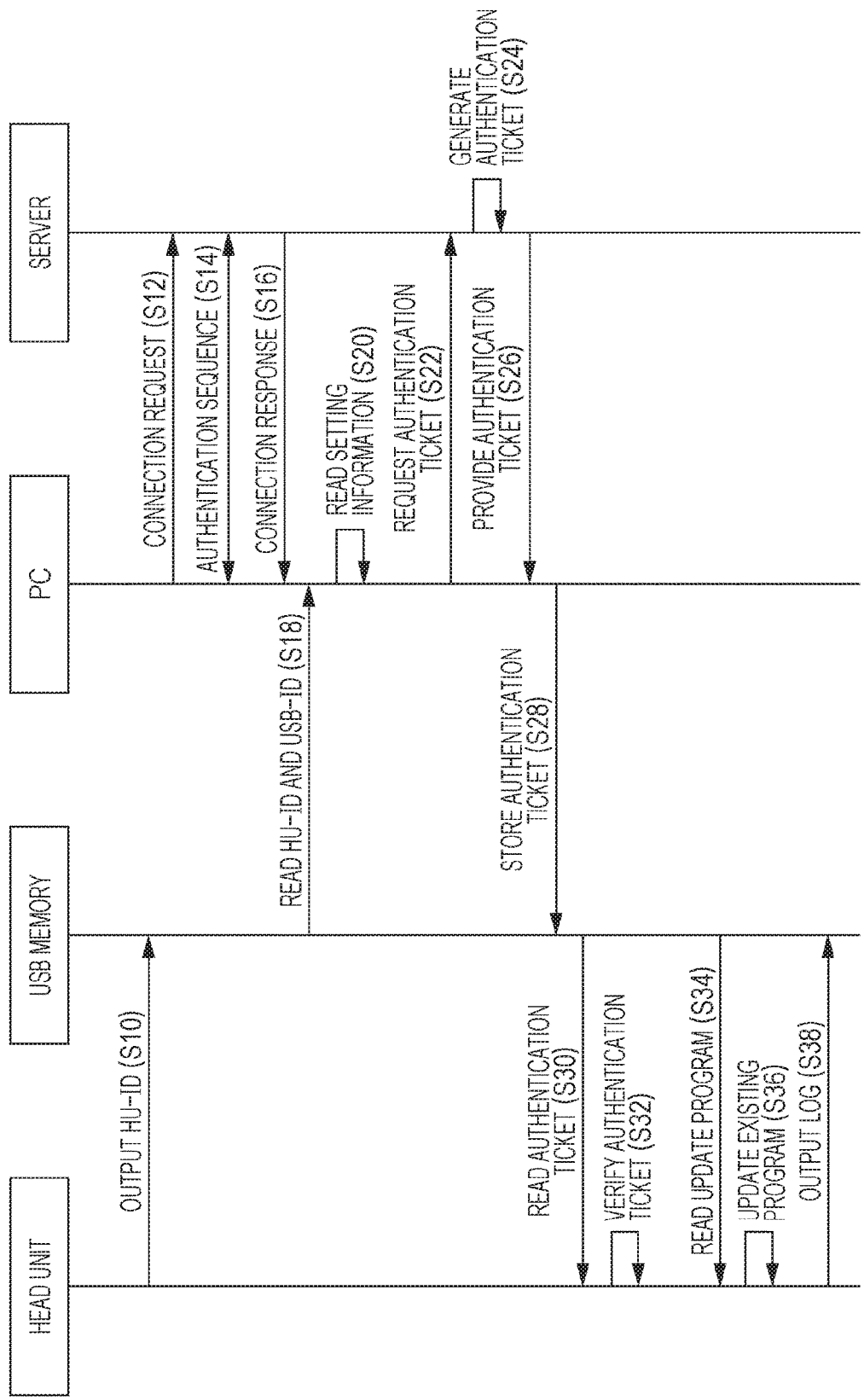
FIG. 8 is a sequence chart illustrating interactions of devices in the information processing system.

FIG. 8 is a sequence chart illustrating interactions of devices in information processing system 10. A user who should perform a maintenance operation for head unit 14 first connects USB memory 18 to USB-IF 34 of head unit 14, ID output unit 52 of head unit 14 stores an HU-ID in USB memory 18 (S10). The user then connects USB memory 18 to USB-IF 64 of PC 16 so as to start ticket issuing application 68 through PC 16. Log-in trial unit 70 of PC 16 sends a connection request telegraphic message to server 20 (S12). Log-in trial unit 70 of PC 16 and authentication unit 88 of server 20 cooperate with each other to execute a predetermined authentication sequence (S14).

In here, authentication is regarded as successful, and authentication unit 88 of server 20 sends a connection response representing successful authentication to PC 16 (S16). When authentication has been failed, server 20 may send a connection response representing failed authentication to PC 16 so as to request again PC 16 for another log-in trial, or may reject a subsequent request from PC 16 for which authentication has not been successful. Upon receiving a connection response successful authentication, ID acquisition unit 72 of PC 16 acquires an HU-ID and a USB-ID from USB memory 18 (S18). Setting information acquisition unit 74 of PC 16 acquires ticket setting information entered by a user via a predetermined screen (S20).

Ticket requesting unit 76 of PC 16 sends the HU-ID, the USB-ID, and the ticket setting information to server 20 so as to request issuance of authentication ticket 26 (S22). Upon a request for issuance of authentication ticket 26 from PC 16 which has performed authentication successfully, ticket generating unit 92 of server 20 generates authentication ticket 26 including the HU-ID, the USB-ID, and the ticket setting information received from PC 16 (S24). Ticket output unit 94 of server 20 sends authentication ticket 26 to PC 16 (S26), and ticket storing unit 78 of PC 16 stores authentication ticket 26 sent from server 20, in USB memory 18 (S28).

The user connects USB memory 18 to USB-IF 34 of head unit 14. Ticket reader 54 of head unit 14 reads authentication ticket 26 from USB memory 18 (S30), and ticket verification unit 56 verifies validity of authentication ticket 26 (S32). When a content of a process specified in authentication ticket 26 is reprogramming, maintenance processor 58 of head unit 14 reads an update program from USB memory 18 (S34) so as to update an existing program stored in an area specified in authentication ticket 26 through the update program (S36). When a content of a process specified in authentication ticket 26 is log output, maintenance processor 58 stores in USB memory 18 at least a part of a log stored in log retaining unit 38 (S38).

Figure 9:
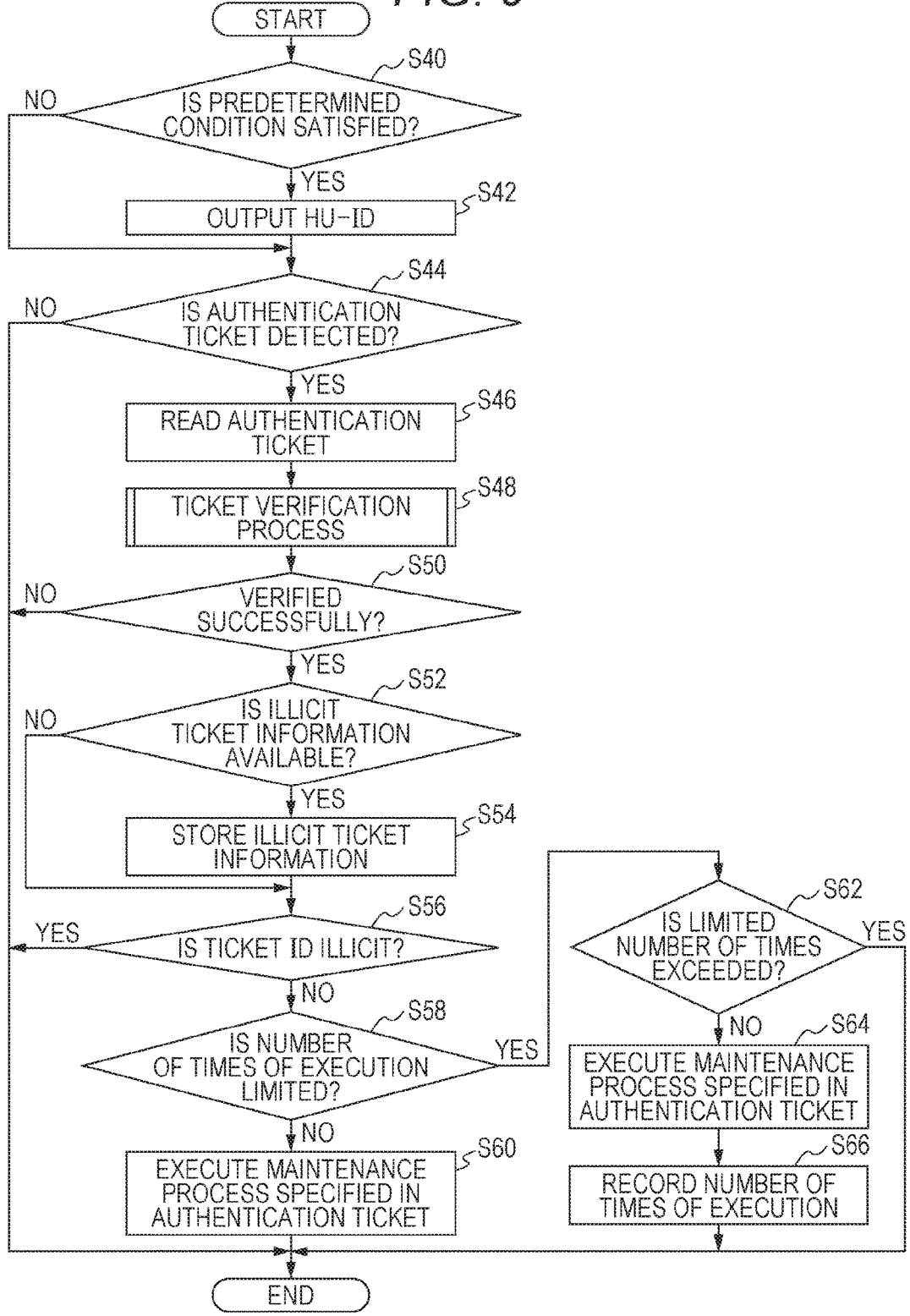
FIG. 9 is a flowchart illustrating an operation of the head unit.

FIG. 9 is a flowchart illustrating an operation of head unit 14, and illustrates a process related to authentication ticket 26. Although not illustrated in FIG. 9, audio and video processor 46 of head unit 14 responds to an operation of a user so as to execute a process for playing and a process for outputting audio and video. Log recording unit 48 of head unit 14 successively stores in log retaining unit 38 a log representing states of data processing in audio and video processor 46 and maintenance unit 50, and whether there is an abnormality.

If USB memory 18 is connected to USB-IF 34, and a predetermined condition is satisfied (Y in S40), ID output unit 52 stores the HU-ID in USB memory 18 (S42). If the predetermined condition is not satisfied (N in S40), S42 is skipped. When USB memory 18 is connected to USB-IF 34, and authentication ticket 26 contained in USB memory 18 is detected (Y in S44), ticket reader 54 reads authentication ticket 26 from USB memory 18 (S46). Ticket verification unit 56 executes a verification process for authentication ticket 26 that has been read (S48).

When the verification process for authentication ticket 26 has completed successfully, in other words, authentication ticket 26 has been confirmed as valid (Y in S50), maintenance processor 58 detects illicit ticket information in authentication ticket 26 if included (Y in S52), and stores the illicit ticket information in illicit ticket information retaining unit 44 (S54). When authentication ticket 26 does not include illicit ticket information (N in S52), S54 is skipped. When a ticket ID of authentication ticket 26 does not match with a ticket ID retained in illicit ticket information retaining unit 44 (N in S56), and no limit to a number of times authentication ticket 26 is used is specified (N in S58), maintenance processor 58 executes a maintenance process specified in authentication ticket 26, and the flow of this chart ends (S60).

When a limit to a number of times authentication ticket 26 is used is specified (Y in S58), maintenance processor 58 acquires a number of times of actual execution of authentication ticket 26, which is retained in execution information retaining unit 42. When the number of times of actual execution of authentication ticket 26 is below limit value of the number of times of use (N in S62), maintenance processor 58 executes the maintenance process specified in authentication ticket 26 (S64). Maintenance processor 58 increments the number of times of actual execution of authentication ticket 26, which is retained in execution information retaining unit 42, and the flow of this chart ends (S66). When a number of times of actual execution is not retained, a number of times of actual execution "1" is newly stored. When a number of times of actual execution of authentication ticket 26 has reached to the limit value of the number of times of use, in other words, the number of times of use will exceed the limit value if authentication ticket 26 is used further (Y in S62), S64 and S66 are skipped.

When authentication ticket 26 is riot stored in USB memory 18 (N in S44), subsequent processes are skipped, and the flow of this chart ends. When a verification process on authentication ticket 26 has been failed, in other words, authentication ticket 26 has been determined as illicit to at least the head unit itself (N in S50), the process on authentication ticket 26 ends. In other words, a process in S52 and subsequent processes are skipped, and the flow of this chart ends. When the ticket ID of authentication ticket 26 matches with the ticket ID retained in illicit ticket information retaining unit 44 (Y in S56), maintenance processor 58 does not execute the maintenance process specified in authentication ticket 26, and the flow of this chart ends.

Figure 10:
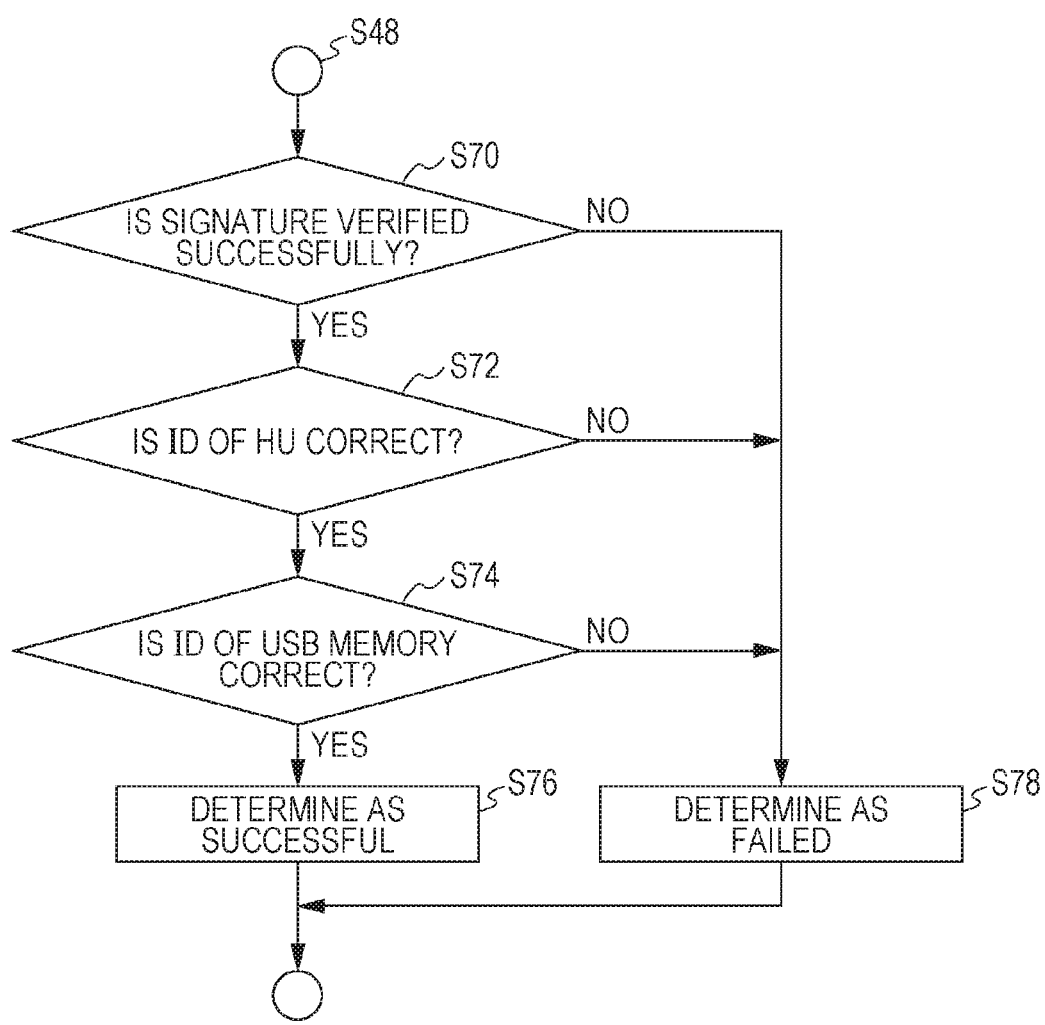
FIG. 10 is a flowchart illustrating in detail a ticket verification process in S48 illustrated in FIG. 9.

FIG. 10 is a flowchart illustrating in detail a ticket verification process in S48 illustrated in FIG. 9. Ticket verification unit 56 verifies, based on signature data 27 of authentication ticket 26, whether ticket data 28 is falsified. Ticket verification unit 56 determines whether an HU-ID represented in authentication ticket 26 (ticket data 28) matches with an ID of the head unit itself. Ticket verification unit 56 determines whether a USB-ID represented in authentication ticket 26 (ticket data 28) matches with an ID of USB memory 18 connected to the head unit itself.

When the verification based on signature data 27 has been completed successfully (Y in S70), the HU-ID represented in authentication ticket 26 matches with the ID of the head unit itself (Y in S72), and the USB-ID represented in authentication ticket 26 match with the ID of USB memory 18 (Y in S74), ticket verification unit 56 determines that authentication ticket 26 has been verified successfully (S76). In other words, authentication ticket 26 read from USB memory 18 is determined as a valid authentication ticket specifying data processing that should be executed by the head unit itself. On the other hand, when the verification of signature data 27 has been failed (N in S70), the HU-ID represented in authentication ticket 26 does not match with the ID of the head unit itself (N in S72), or the USB-ID represented in authentication ticket 26 does not match with the ID of USB memory 18 (N in S74), ticket verification unit 56 determines that the verification of authentication ticket 26 has been failed (S78). In other words, authentication ticket 26 read from USB memory 18 is determined as an illicit authentication ticket.

With information processing system 10 according to the first exemplary embodiment, server 20 issues authentication ticket 26 specifying data processing specified by an authenticated user, and head unit 14 executes the data processing specified in authentication ticket 26. Data processing to be executed by head unit 14 is therefore limited to data processing specified by a user having a valid authority, and thus security in head unit 14 can be improved. If authentication ticket 26 has been leaked, processes executable by head unit 14 are limited to data processing specified by a user having a valid authority. A risk can therefore be reduced even if authentication ticket 26 has been leaked.

Specifying a maximum number of times within which data processing with authentication ticket 26 is permitted can limit a number of times of data processing in head unit 14 using authentication ticket 26 within the maximum number of times. A risk can therefore further be reduced even if authentication ticket 26 has been leaked.

Head unit 14 executes data processing specified in authentication ticket 26 when authentication ticket 26 has not been falsified, authentication ticket 26 has been issued to the head unit itself, and authentication ticket 26 has been issued to USB memory 18 connected to the head unit itself. Therefore, head unit 14 can be prevented from executing Illicit data processing that differs from data processing specified by a valid user. Further, head unit 14 can be prevented from executing illicit data processing with authentication ticket 26 issued to a device that differs from head unit 14, or to a device that differs from USB memory 18 connected to head unit 14.

Second Exemplary Embodiment

A second exemplary embodiment proposes a technology that causes single head unit 14 to separately manage a number of times data processing is actually executed based on each of a plurality of authentication tickets 26. Differences from the first exemplary embodiment will be described below. The second exemplary embodiment does riot refer to points similar or identical to corresponding points of the first exemplary embodiment.

ID output unit 52 of head unit 14 stores in USB memory 18, in addition to an HU-ID that is a unique ID of the head unit itself, additional data having a value that differs depending on a timing. That is, head unit 14 (ID output unit 52) issues (records in USB memory 18) the additional data in addition to the HU-ID. Additional data may be, for example, a random numerical value generated by a predetermined random number generator, in other words, data (a random value) having a value that differs depending on a generation timing. Ticket generating unit 92 of server 20 sets a combination of the HU-ID and the additional data as identification information of head unit 14 in authentication ticket 26 (an ID attribute of a Ticket tag in ticket data 28).

There is a difference in additional data between first authentication ticket 26 generated at a first timing and second authentication ticket 26 generated at a timing different from the first timing, and thus there is a difference in identification information of head unit 14 between both the tickets. Typically, respective specified contents of data processing differ between first authentication ticket 26 and second authentication ticket 26. Note that a maximum number of times a ticket is used is specified for both first authentication ticket 26 and second authentication ticket 26.

When ticket verification unit 56 of head unit 14 extracts an HU-ID from identification information of head unit 14 represented in authentication ticket 26 and the extracted HU-ID matches with a unique ID of the head unit itself, ticket verification unit 56 determines that authentication ticket 26 has been verified successfully. Head unit 14 may store additional data added when an ID is output. When identification information of head unit 14 which is represented in authentication ticket 26 matches with the unique ID of the head unit itself+the additional data, ticket verification unit 56 may determine that authentication ticket 26 has been verified successfully.

When first authentication ticket 26 has been verified successfully, maintenance processor 58 of head unit 14 acquires a number of times of actual execution, which is linked to identification information of head unit 14 (HU-ID+additional data) represented in first authentication ticket 26 and which is stored in execution information retaining unit 42. As long as the acquired number of times of actual execution is below a maximum number of times represented in first authentication ticket 26, maintenance processor 58 executes data processing specified in first authentication ticket 26. When the data processing based on first authentication ticket 26 has been executed, maintenance processor 58 links a number of times the data processing is actually executed based on first authentication ticket 26 to the identification information of head unit 14 (HU-ID+additional data) represented in first authentication ticket 26, and records the number in execution information retaining unit 42.

When second authentication ticket 26 has been verified successfully, maintenance processor 58 acquires a number of times of actual execution, which is linked to identification information of head unit 14 (HU-ID+additional data) represented in second authentication ticket 26 and which is stored in execution information retaining unit 42. As long as the acquired number of times of actual execution is below a maximum number of times represented in second authentication ticket 26, maintenance processor 58 executes data processing specified in second authentication ticket 26. When the data processing based on second authentication ticket 26 has been executed, maintenance processor 58 links a number of times the data processing is actually executed based on second authentication ticket 26 to the identification information of head unit 14 (HU-ID+additional data) represented in second authentication ticket 26, and records the number in execution information retaining unit 42. A number of times of actual execution may be linked to only additional data represented in authentication ticket 26, and recorded.

According to the second exemplary embodiment, in single head unit 14, a number of times of data processing based on each of a plurality of authentication tickets 26 can be distinguished and managed per each of authentication tickets 26. Therefore, data processing based on each of the plurality of authentication tickets 26, which will be executed in single head unit 14, can be limited within a range of a maximum number of times specified in each of authentication tickets 26.

The configuration according to the second exemplary embodiment is particularly useful when authentication ticket 26 does not include a ticket ID. When authentication ticket 26 includes a ticket ID, the ticket ID may be used, instead of additional data, to control a maximum number of times of data processing per authentication ticket 26. In this case, a configuration of ID output unit 52 of head unit 14, and a configuration of authentication ticket 26 may be similar or identical to corresponding configurations in the first exemplary embodiment. When data processing based on first authentication ticket 26 has been executed, maintenance processor 58 of head unit 14 may link a number of times the data processing is actually executed based on first authentication ticket 26 to a ticket ID represented in first authentication ticket 26, and may record the number. When data processing based on second authentication ticket 26 has been executed, maintenance processor 58 may link a number of times the data processing is actually executed based on second authentication ticket 26 to a ticket ID represented in second authentication ticket 26, and may record the number.

Third Exemplary Embodiment

Storage unit 32 of head unit 14 may contain, beforehand at a time of shipping, for example, information representing an area in which head unit 14 is supposed to be used, or an area in which use of head unit 14 is permitted (hereinafter referred to as an "available area"). Storage unit 32 of head unit 14 may contain, beforehand at a time of shipping, for example, information representing an area to which head unit 14 is shipped (hereinafter referred to as "shipping area"). Head unit 14 may further include a position detector that detects a present position of head unit 14 based on a global positioning system (GPS). Applicable areas with various sizes are assumed, and thus for example, a country, a state and a region, or a prefecture may be set as such areas.

Ticket generating unit 92 of server 20 may further set information, which represent an area where data processing should be executed (hereinafter referred to as "area limit information"), in authentication ticket 26. For example, to limit an area where data processing should be executed to Japan, ticket generating unit 92 may set area limit information "Japan" in an area attribute of an availability tag in ticket data 28. A user of PC 16 may enter area limit information, and may cause PC 16 to send a ticket issuance request including the area limit information to server 20. Server 20 may retain beforehand a correspondence relationship between an ID of a user (or an HU-ID) and an area, and ticket generating unit 92 may set area limit information, which represents an area linked to the ID of the user authenticated successfully or the HU-ID notified by the user, in authentication ticket 26.

When an area represented in area limit information in authentication ticket 26 matches with an available area, maintenance processor 58 of head unit 14 may execute data processing specified in authentication ticket 26. When an area represented in area limit information in authentication ticket 26 matches with a shipping area, maintenance processor 58 may execute data processing specified in authentication ticket 26. When an area represented in area limit information in authentication ticket 26 matches with a present position of head unit 14, in other words, when head unit 14 is present in the area represented in area limit information in authentication ticket 26, maintenance processor 58 may further execute data processing specified in authentication ticket 26. When an area represented in area limit information in authentication ticket 26 does not match at least one of an available area, a shipping area, and a present position, maintenance processor 58 may suppress execution of data processing specified in authentication ticket 26.

According to the third exemplary embodiment, data processing to be executed by head unit 14 can be limited based on an area specified as an attribute of head unit 14. Setting area limit information in authentication ticket 26 can limit head unit 14 capable of executing data processing based on authentication ticket 26.

The present disclosure has been described based on the first to third exemplary embodiments. It will be understood by those skilled in the art that these exemplary embodiments are merely examples, other exemplary modifications in which components and/or processes of the exemplary embodiments are variously combined are possible, and the other exemplary modifications are still fall within the scope of the present disclosure.

An exemplary modification will now be described. In authentication ticket 26 according to the first exemplary embodiment, a maximum number of times of data processing permitted to be executed by head unit 14 has been specified. As an exemplary modification, in authentication ticket 26, instead of or in addition to a maximum number of times of data processing permitted to be executed by head unit 14, a period, during which head unit 14 is permitted to execute data processing, may be specified.

For example, a user of PC 16 may enter a start date and an effective period of authentication ticket 26, as ticket setting information, and ticket generating unit 92 of server 20 may set the start date and the effective period as attributes of an availability tag in ticket data 28. A user of PC 16 may enter a start date and an end date of authentication ticket 26, as ticket setting information, and ticket generating unit 92 of server 20 may set the start date and the end date as attributes of an availability tag in ticket data 28.

When a current date (a system date) falls within a period represented in authentication ticket 26, maintenance processor 58 of head unit 14 may execute data processing specified in authentication ticket 26. Since a period during which head unit 14 executes data processing can be therefore limited, security in head unit 14 can be further improved. When both conditions of a maximum number of times and a period represented in authentication ticket 26 are satisfied, maintenance processor 58 may execute data processing specified in authentication ticket 26.

Ticket generating unit 92 of server 20 may automatically set a maximum number of times within which or a period during which head unit 14 executes data processing. For example, ticket generating unit 92 may automatically set in authentication ticket 26 a value of a maximum number of times or a period set beforehand. Ticket generating unit 92 may automatically set in authentication ticket 26 values of a maximum number of times or a period linked beforehand to a certain user or certain head unit 14, based on an ID of a user or an HU-ID.

Another exemplary modification will now be described. Although not described in the above exemplary embodiments, server 20 may issue authentication ticket 26 effective to a plurality of information devices. A plurality of information devices may be a plurality of head units 14 mounted in a plurality of vehicles 12, or a plurality of head units 14 mounted in single vehicle 12. The plurality of head units 14 should each includes, as a prerequisite, an interface to a removable medium (a USB interface in here).

The plurality of head units 14 each store an HU-ID of the head unit itself in ID file 24 in USB memory 18. Each of the HU-IDs of the plurality of head units 14 is notified to server 20 by a ticket issuance request sent from PC 16. Ticket generating unit 92 of server 20 generates, for example, as illustrated in FIG. 4, authentication ticket 26 including a plurality of HU-IDs. Authentication ticket 26 including the plurality of HU-IDs effectively acts in the plurality of head units 14 corresponding to the plurality of HU-IDs. In other words, when sequentially connecting USB memory 18 containing authentication ticket 26 including the plurality of HU-IDs to the plurality of head units 14, a user can cause each of the plurality of head units 14 to execute data processing specified in authentication ticket 26.

According to this exemplary modification, since server 20 may issue only one authentication ticket 26 when causing a plurality of head units 14 to execute single data processing, an operational burden to a user can be reduced.

Figure 11:
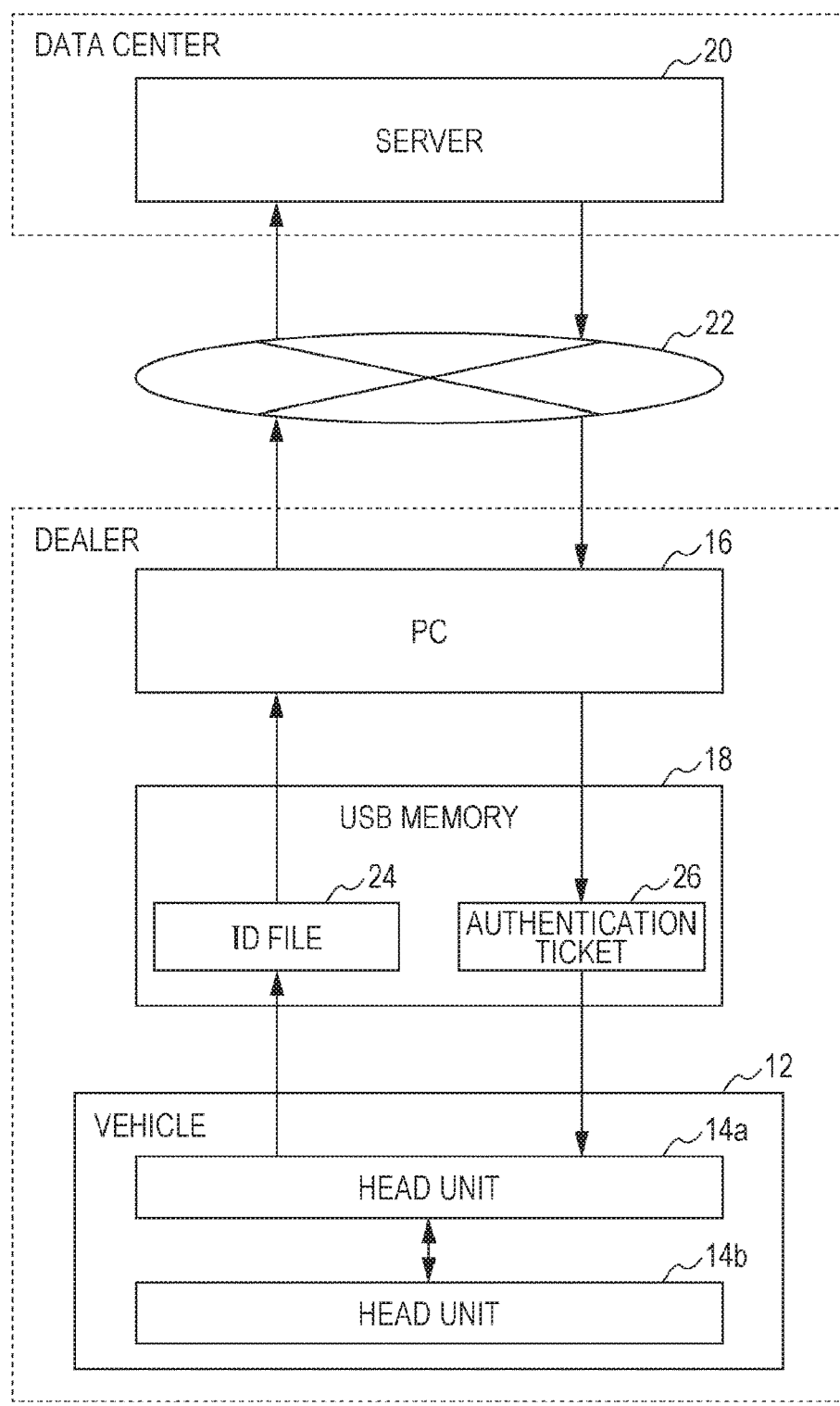
FIG. 11 is a diagram illustrating a configuration of an information processing system according to an exemplary modification.

Still another exemplary modification will now be described. FIG. 11 illustrates a configuration of information processing system 10 according to the exemplary modification. Vehicle 12 is mounted with a plurality of head units 14 (head unit 14a, head unit 14b). Head unit 14a includes USB-IF 34, while head unit 14b does not include USB-IF 34. However, head unit 14a and head unit 14b are connected (coupled) to each other, and head unit 14b is configured to be accessible to USB memory 18 via USB-IF 34 of head unit 14a.

When USB memory 18 is connected to USB-IF 34 of head unit 14a, and a predetermined operation is entered to head unit 14a, head unit 14a outputs its HU-ID to ID file 24 in USB memory 18, When a predetermined operation is then entered to head unit 14b, head unit 14b outputs its HU-ID to ID file 24 in USB memory 18 via head unit 14a. Similar to the previous exemplary modifications, ticket generating unit 92 of server 20 subsequently generates, for example, authentication ticket 26 including a plurality of HU-IDs (in here, an HU-ID of head unit and an HU-ID of head unit 14b) as illustrated in FIG. 4.

When USB memory 18 is connected to USB-IF 34 of head unit 14a, head unit 14a detects authentication ticket 26 in USB memory 18. Since authentication ticket 26 includes the HU-ID of head unit 14a, head unit 14a verifies authentication ticket 26 successfully, and executes data processing specified in authentication ticket 26. Similarly, head unit 14b detects authentication ticket 26 in USB memory 18. Since authentication ticket 26 includes the HU-ID of head unit head unit 14b verifies authentication ticket 26 successfully, and executes data processing specified in authentication ticket 26.

As described above, when only some of a plurality of information devices include an interface to a removable medium, as long as the plurality of information devices is coupled to each other, and all the information devices can access to the removable medium, data processing to be executed by the plurality of information devices can be controlled by authentication ticket 26. In other words, authentication ticket 26 enables effective improvement of security in a plurality of information devices including an information device that does not have an interface to a removable medium.

Still another exemplary modification will now be described. In the first exemplary embodiment, illicit ticket information has been stored in authentication ticket 26, and head unit 14 has extracted the illicit ticket information from authentication ticket 26. As still another exemplary modification, head unit 14 may include a communication unit (not illustrated) that communicates with an external device via a communication network, and may periodically acquire illicit ticket information from a predetermined external device via the communication unit.

Still another exemplary modification will now be described. In the first exemplary embodiment, PC 16 and USB memory 18 have been used as devices that mediate data exchange (transmission of an ID and authentication ticket 26) between head unit 14 and server 20. As still another exemplary modification, the mediating device described above may be a single device that can be connected as a removable medium to head unit 14, and can be communicated as a client device to server 20. For example, the mediating device may be a single smart phone or a single tablet terminal.

It will be understood by those skilled in the art that the techniques described in the above exemplary embodiments and the exemplary modifications are not limited to a head unit mounted to a vehicle, but are applicable to head units installed in something other than vehicles, and are applicable to various information devices other than head units. For example, the techniques described in the exemplary embodiments and the exemplary modifications are applicable to, as long as devices can be connected to a removable medium, not only head units, but also all kinds of electronic control units (ECUs) that are information devices mounted into vehicles. These electronic control units (ECUs) that are information devices include meters, communication modules, central gateways, engine ECUs, steering ECUs, and advanced driver assistance system (ADAS) ECUs.

Any desired combinations of the above described exemplary embodiments and the above described exemplary modifications are also useful as other exemplary embodiments of the present disclosure. Any new exemplary embodiments formed by such combinations include benefits of the exemplary embodiments and the exemplary modifications combined into the new exemplary embodiments. It will be understood by those skilled in the art that functions that should be carried out by components described in the appended claims can be achieved by each of or through cooperation of the components illustrated in the exemplary embodiments and the exemplary modifications.

The techniques described in the exemplary embodiments and the exemplary modifications may also be identified through items illustrated. below.

[Item 1]

An information device including a reader that reads, from a removable medium, ticket data which is provided from a server upon successful authentication, and which includes information representing a content of data processing to be executable upon the successful authentication, and a data processor that executes the data processing represented in the ticket data.

Therefore, an information device that executes data processing executable upon successful authentication in a server, based on ticket data provided from the server can be achieved, and thus security in the information device can be improved. Reading ticket data from a removable medium is advantageous to an information device that cannot be sometimes connected to a server (e.g., a head unit mounted in a vehicle).

[Item 2]

The ticket data may further include information representing a number of times within which data processing is permitted or a period during which data processing is permitted, and the data processor may execute, within the number of times or during the period, the data processing represented in the ticket data.

Therefore, a number of times within which or a period during which an information device executes data processing can be limited, and thus security in the information device can be further improved.

[Item 3]

The information device may further include an output unit that stores, into the removable medium, first identification information of the information device. The ticket data may further include second identification information set by the server based on the first identification information stored in the removable medium. When the second identification information included in the ticket data matches with the first identification information, the data processor may execute data processing represented in the ticket data.

Therefore, since the information device executes data processing under a condition that ticket data has been issued to the device itself, security in the information device can be further improved.

[Item 4]

The information device may further include an output unit that stores the first identification information of the information device and additional data having a value that differs depending on a timing into the removable medium. The ticket data may further include the additional data and second identification information set by the server based on the first identification information and the additional data stored in the removable medium. The ticket data may include first ticket data, and second ticket data that differs from the first ticket data. The additional data may include first additional data, and second additional data that differs from the first additional data. When the second identification information included in the ticket data matches with the first identification information, the data processor may execute data processing represented in the ticket data. When data processing based on the first ticket data is executed, the data processor may link information regarding a number of times of data processing to the first additional data included in the first ticket data, and record the information. When data processing based on the second ticket data is executed, the data processor may link information regarding a number of times of data processing to the second additional data included in the second ticket data, and record the information.

Therefore, even when a plurality of pieces of ticket data has been issued to the device itself, the information device can identify each of the pieces of ticket data through the additional data so as to manage, per ticket, a number of times of data processing specified in each of the pieces of ticket data.

[Item 5]

The information device may further include an output unit. The output unit may store first identification information of the information device into the removable medium and into a predetermined storage unit. The output unit may store second identification information of the information device that differs from the first identification information into the removable medium and into the predetermined storage unit. The first identification information is decided to a first random value and the second identification information is decided to a second random value. The ticket data may further include third identification information set by the server based on the first identification information stored in the removable medium, and fourth identification information set by the server based on the second identification information stored in the removable medium. The ticket data may include first ticket data, and second ticket data that differs from the first ticket data. When the first identification information included in the first ticket data matches with the third identification information stored in the storage unit, the data processor may execute data processing represented in the first ticket data, and may execute. When the second identification information included in the second ticket data matches with the fourth identification information stored in the storage unit, the data processor may execute data processing represented in the second ticket data. When data processing based on the first ticket data is executed, the data processor may link information regarding a number of times of data processing to the first identification information included in the first ticket data, and record the information. When data processing based on the second ticket data is executed, the data processor may link information regarding a number of times of data processing to the second identification information included in the second ticket data, and record the information.

Therefore, even when a plurality of pieces of ticket data has been issued to the device itself, the information device can identify each of the pieces of ticket data through the identification information of the device itself, which has been set to a random value, and can manage, per ticket, a number of times of data processing specified in each of the pieces of ticket data.

[Item 6]

The information device may further include a storage unit. The ticket data may include identification information of the ticket data itself for identifying from other ticket data, and illicit ticket information of illicit ticket data. The storage unit may store the illicit ticket information included in the ticket data. When the identification information of the ticket data itself which has been read by the reader, corresponds to the illicit ticket information stored in the storage unit, the data processor may restrict execution of data processing represented in the ticket data (for example, the data processor may not execute the data processing of the data processing represented in the ticket data).

As described above, since the information device retains a so-called black list regarding illicit tickets, the information device can suppress execution of illicit data processing based on an illicit ticket.

[Item 7]

The server may acquire identification information of the removable medium, and set the information in the ticket data. The reader may read the identification information of the removable medium from the removable medium separately from the ticket data. When the identification information included in the ticket data matches with the identification information of the removable medium, the data processor may execute data processing represented in the ticket data.

Therefore, since the information device executes data processing under a condition that ticket data has been issued to a removable medium connected to the device itself, security in the information device can be further improved.

[Item 8]

The ticket data may further include information representing an area in which data processing is to be executed. The data processor may execute, when the area represented the information included in the ticket data satisfies a predetermined condition, data processing represented in the ticket data.

Therefore, an area condition is added as a condition for executing data processing, security in the information device can be further improved. For example, execution of data processing outside a target area can be suppressed.

[Item 9]

A data processing system including an information device capable of reading data from a removable medium, and a server. The server includes an authentication unit that authenticates a user, and an output unit that stores, when the authentication unit has authenticated the user successfully, ticket data representing a content of data processing specified by the user in the removable medium. The information device includes a reader that reads the ticket data from the removable medium, and a data processor that executes the data processing represented in the ticket data.

This configuration can achieve an information device that executes data processing specified by the user based on ticket data provided from the server when a server has authenticated a user successfully. Accordingly, security in the information device can be improved. Reading ticket data from a removable medium is advantageous to an information device that cannot be sometimes connected to a server.

[Item 10]

A data processing method executed by an information device, the data processing method including reading, from a removable medium, ticket data that is provided from a server upon successful authentication, and that represents a content of data processing to be executable upon the successful authentication, and executing the data processing represented in the read ticket data.

This configuration can achieve an information device that executes data processing executable upon successful authentication in a server, based on ticket data provided from the server. Accordingly, security in the information device can be improved, Reading ticket data from a removable medium is advantageous to an information device that cannot be sometimes connected to a server.

[Item 11]

A non-transitory storage medium containing a program for causing an information device as a computer to execute a data processing method including reading, from a removable medium, ticket data that is provided from a server upon successful authentication, and that represents a content of data processing to be executable upon the successful authentication, and executing the data processing represented in the read ticket data.

This configuration can achieve an information device that executes data processing executable upon successful authentication in a server, based on ticket data provided from the server. Accordingly, security in the information device can be improved. Reading ticket data from a removable medium is advantageous to an information device that cannot be sometimes connected to a server.

What is claimed is:

1. An information device comprising:
a reader that reads, from a removable medium, ticket data provided from a server, the ticket data being provided from the server upon successful authentication, and the ticket data including information representing an executable content that is to be executable upon the successful authentication; and a data processor that executes the executable content represented in the ticket data, and stores, in the removable medium, first identification information of the information device and additional data having a value that differs depending on a timing, wherein the ticket data further includes information representing a number of times that the executable content is permitted to be executed or a period during which the executable content is permitted to be executed, the additional data and second identification information set by the server based on the first identification information, and first ticket data and second ticket data that differs from the first ticket data, wherein the additional data includes first additional data and second additional data that differs from the first additional data, and wherein the data processor executes the executable content within the number of times that the executable content is permitted to be executed or within the period during which the executable content is permitted to be executed, when the second identification information included in the ticket data matches the first identification information, links, when the executable content is executed based on the first ticket data, first information regarding a number of times the executable content is executed to the first additional data included in the first ticket data, and records the first information, and links, when the executable content is executed based on the second ticket data, second information regarding a number of times the executable content is executed to the second additional data included in the second ticket data, and records the second information.

2. The information device according to claim 1, wherein the data processor stores third identification information of the information device in the removable medium and in a memory storage, and stores fourth identification information of the information device that differs from the third identification information in the removable medium and in the memory storage, wherein the third identification information is decided to a first random value and the fourth identification information is decided to a random value, wherein the ticket data further includes fifth identification information set by the server based on the third identification information stored in the removable medium, and sixth identification information set by the server based on the fourth identification information stored in the removable medium, the ticket data includes third ticket data and fourth ticket data that differs from the third ticket data, the data processor executes, when the third identification information included in the third ticket data matches the fifth identification information stored in the memory storage, executable content represented in the third ticket data, and executes, when the fourth identification information included in the fourth ticket data matches the sixth identification information stored in the memory storage, executable content represented in the fourth ticket data, and the data processor links, when the executable content based on the third ticket data is executed, third information regarding a number of times of the executable content is executed to the third identification information included in the third ticket data, and records the third information, and links, when the executable content based on the fourth ticket data is executed, fourth information regarding a number of times of the executable content is executed to the fourth identification information included in the fourth ticket data, and records the fourth information.

3. The information device according to claim 1, further comprising a memory storage, wherein the ticket data includes identification information of the ticket data itself for identifying from other ticket data, and illicit ticket information of illicit ticket data, the memory storage stores the illicit ticket information included in the ticket data, and the data processor restricts, when the identification information of the ticket data itself read by the reader corresponds to the illicit ticket information stored in the memory storage, execution of the executable content represented in the ticket data.

4. The information device according to claim 1, wherein the server acquires identification information of the removable medium and sets the identification information in the ticket data, the reader reads the identification information of the removable medium from the removable medium separately from the ticket data, and the data processor executes, when the identification information included in the ticket data matches the identification information of the removable medium, the executable content represented in the ticket data.

5. The information device according to claim 1, wherein the ticket data further includes area information representing an area where the executable content is to be executed, and the data processor executes, when the area information representing the area included in the ticket data satisfies a predetermined condition, the executable content represented in the ticket data.

6. A data processing system comprising:

an information device capable of reading data from a removable medium; and a server, wherein the server includes a processor that authenticates a user, and stores in the removable medium, when the the user is successfully authenticated, ticket data including information representing an executable content specified by the user, and the information device includes a reader that reads the ticket data from the removable medium, the ticket data being provided from the server upon successful authentication, and a data processor that executes the executable content represented in the ticket data, and stores, in the removable medium, first identification information of the information device and additional data having a value that differs depending on a timing, wherein the ticket data further includes information representing a number of times that the executable content is permitted to be executed or a period during which the executable content is permitted to be executed, the additional data and second identification information set by the server based on the first identification information, and first ticket data and second ticket data that differs from the first ticket data, wherein the additional data includes first additional data and second additional data that differs from the first additional data, and wherein the data processor executes the executable content within the number of times that the executable content is permitted to be executed or within the period during which the executable content is permitted to be executed, when the second identification information included in the ticket data matches the first identification information, links, when the executable content is executed based on the first ticket data, first information regarding a number of times the executable content is executed to the first additional data included in the first ticket data, and records the first information, and links, when the executable content is executed based on the second ticket data, second information regarding a number of times the executable content is executed to the second additional data included in the second ticket data, and records the second information.

7. A data processing method executed by an information device, the data processing method comprising:

reading, from a removable medium, ticket data provided from a server, the ticket data being provided from the server upon successful authentication, and the ticket data including information representing an executable content that is to be executable upon the successful authentication, and executing the executable content represented in the read ticket data, and storing, in the removable medium, first identification information of the information device and additional data having a value that differs depending on a timing, wherein the ticket data further includes information representing a number of times that the executable content is permitted to be executed or a period during which the executable content is permitted to be executed, the additional data and second identification information set by the server based on the first identification information, and first ticket data and second ticket data that differs from the first ticket data, wherein the additional data includes first additional data and second additional data that differs from the first additional data, and wherein the method further comprises:

executing the executable content within the number of times that the executable content is permitted to be executed or within the period during which the executable content is permitted to be executed, when the second identification information included in the ticket data matches the first identification information, linking, when the executable content is executed based on the first ticket data, first information regarding a number of times the executable content is executed to the first additional data included in the first ticket data, and records the first information, and linking, when the executable content is executed based on the second ticket data, second information regarding a number of times the executable content is executed to the second additional data included in the second ticket data, and records the second information.

8. A non-transitory storage medium storing a program for causing an information device that is a computer to execute the data processing method according to claim 7.

* * * * *